United States Patent [19]
Pedicini

[11] Patent Number: 5,356,729
[45] Date of Patent: Oct. 18, 1994

[54] DIFFUSION CONTROLLED AIR MANAGER FOR METAL-AIR BATTERY

[75] Inventor: Christopher S. Pedicini, Marietta, Ga.

[73] Assignee: AER Energy Resources, Inc., Atlanta, Ga.

[21] Appl. No.: 77,827

[22] Filed: Jun. 15, 1993

[51] Int. Cl.5 .................................. H01M 12/08
[52] U.S. Cl. ......................................... 429/27; 429/35
[58] Field of Search ........................ 429/27, 35, 83

[56] References Cited

U.S. PATENT DOCUMENTS

| | | |
|---|---|---|
| 684,700 | 10/1901 | Lloyd . |
| 737,613 | 9/1903 | Halsey . |
| 1,112,861 | 10/1914 | Synder . |
| 1,285,659 | 11/1918 | Ford . |
| 1,363,889 | 12/1920 | Linebarger . |
| 2,273,244 | 4/1940 | Armbruster . |
| 2,275,281 | 1/1942 | Berl . |
| 2,468,430 | 1/1949 | Derksen . |
| 2,759,038 | 8/1956 | Marsal . |
| 2,907,809 | 10/1959 | Southworth, Jr. et al. . |
| 3,160,528 | 12/1964 | Dengler et al. . |
| 3,372,060 | 3/1968 | Platner . |
| 3,395,047 | 7/1968 | Terry et al. . |
| 3,411,951 | 11/1968 | Gelting . |
| 3,473,963 | 10/1969 | Sanderson . |
| 3,523,830 | 8/1970 | Baker et al. . |
| 3,607,423 | 7/1971 | Bertioli . |
| 3,615,839 | 10/1971 | Thompson . |
| 3,740,636 | 6/1973 | Hogrefe et al. . |
| 3,746,580 | 7/1973 | Aker et al. . |
| 3,840,404 | 10/1974 | Porter et al. . |
| 3,855,000 | 12/1974 | Jammet . |
| 3,897,265 | 7/1975 | Jaggard . |
| 3,898,548 | 8/1975 | Perelle et al. . |
| 3,902,922 | 9/1975 | Kalnoki-Kis . |
| 3,904,441 | 9/1975 | Badger . |
| 4,054,725 | 10/1977 | Tuburaya . |
| 4,118,544 | 10/1978 | Pryzbyla et al. . |
| 4,177,327 | 12/1979 | Matthews et al. ............. 429/27 |
| 4,207,514 | 6/1980 | Klein ................................ 320/44 |
| 4,221,644 | 9/1980 | Terry et al. . |
| 4,246,324 | 1/1981 | de Nora et al. ................ 429/17 |
| 4,262,062 | 4/1981 | Zatsky ............................. 429/27 |
| 4,364,805 | 12/1982 | Rogers ............................ 204/98 |
| 4,448,858 | 5/1984 | Graf et al. ...................... 429/49 |
| 4,490,443 | 12/1984 | Ruch et al. ..................... 429/27 |

(List continued on next page.)

FOREIGN PATENT DOCUMENTS

| | | |
|---|---|---|
| 0265242 | 4/1988 | European Pat. Off. . |
| 0417324 | 3/1991 | European Pat. Off. . |
| 3239396 | 4/1984 | Fed. Rep. of Germany . |
| 2353142 | 12/1977 | France . |
| 48-27096 | 8/1973 | Japan . |
| 50-40773 | 12/1975 | Japan . |
| 59-134570 | 8/1984 | Japan . |

OTHER PUBLICATIONS

Gregory, Metal-Air Batteries, 1972, pp. 33-39, 48-51, 77-79 (month NA).

Collins, Power Sources 2: Research and Development in Non-Mechanical Power Sources, 1968, pp. 423, 429-434, 438-439 (month N/A).

*Primary Examiner*—Stephen Kalafut
*Attorney, Agent, or Firm*—Jones & Askew

[57] ABSTRACT

An air manager system is disclosed which maintains a more stable water vapor and carbon dioxide equilibrium across the air cathode of a metal-air cell while still providing new oxygen needed for operation of the cell at desired power levels. Oxygen is preferentially drawn in through one or more ventilation openings in a housing, so that the concentrations of water vapor and carbon dioxide in the battery housing remain more stable, resulting in less transfer across the cathode. A fan circulates the gases within the battery housing, keeping the oxygen needed for operation of the cell in contact with the air cathode even though the oxygen concentration within the housing is reduced compared to the ambient air outside the housing. Therefore, the cell is less susceptible to drying out or flooding, and less carbon dioxide intrudes into the cell.

22 Claims, 5 Drawing Sheets

U.S. PATENT DOCUMENTS

| | | | |
|---|---|---|---|
| 4,521,497 | 6/1985 | Tamminen | 429/27 |
| 4,588,660 | 5/1986 | Shimizu et al. | 429/35 |
| 4,620,111 | 10/1986 | McArthur et al. | 307/150 |
| 4,687,714 | 8/1987 | Oltman et al. | 429/27 |
| 4,693,946 | 9/1987 | Niksa et al. | 429/27 |
| 4,729,930 | 3/1988 | Beal et al. | 429/13 |
| 4,828,939 | 5/1989 | Turley et al. | 429/38 |
| 4,871,627 | 10/1989 | Strong et al. | 429/27 |
| 4,894,295 | 1/1990 | Cheiky | 429/27 |
| 4,908,281 | 3/1990 | O'Callaghan | 429/27 |
| 4,913,983 | 4/1990 | Cheiky | 429/27 |
| 4,927,717 | 5/1990 | Turley et al. | 429/27 |
| 4,950,561 | 8/1990 | Niksa et al. | 429/27 |
| 4,957,826 | 9/1990 | Cheiky et al. | 429/27 |
| 5,069,986 | 12/1991 | Dworkin et al. | 429/27 |
| 5,093,212 | 3/1992 | Lloyd et al. | 429/27 |
| 5,093,213 | 3/1992 | O'Callaghan | 429/27 |
| 5,156,925 | 10/1992 | Lapp | 429/27 X |
| 5,191,274 | 3/1993 | Lloyd et al. | 429/27 X |

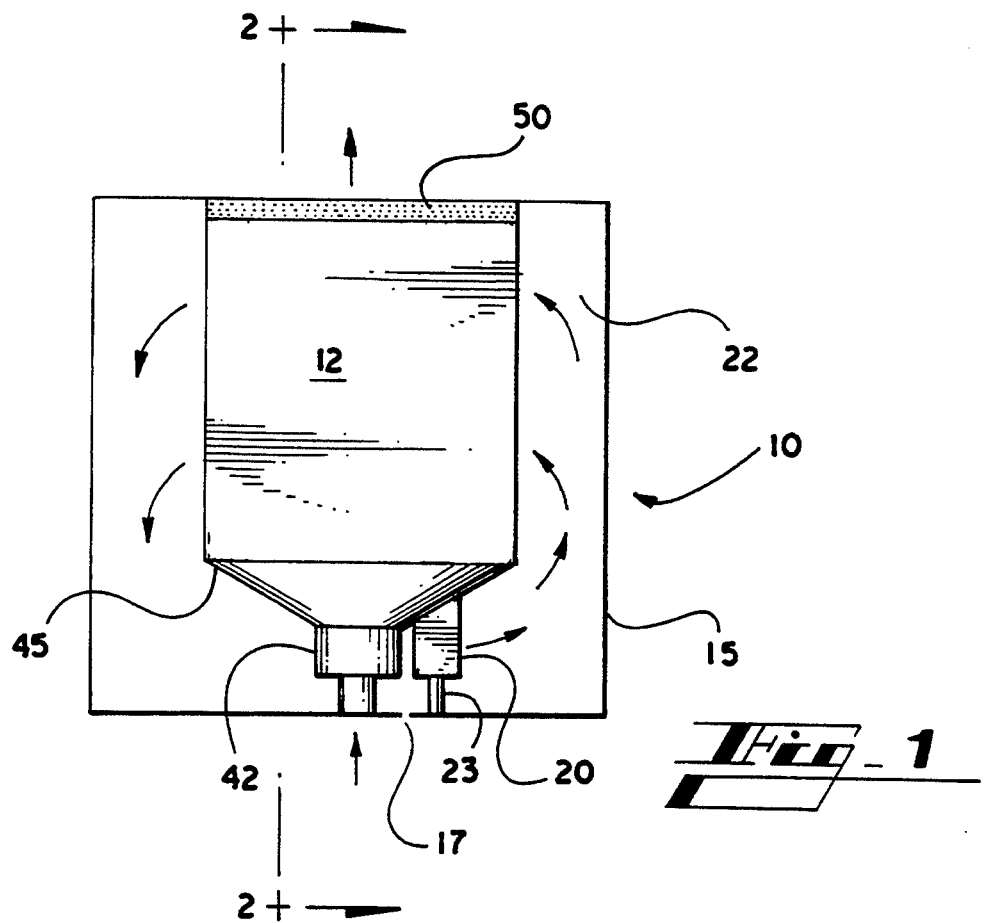
FIG_1
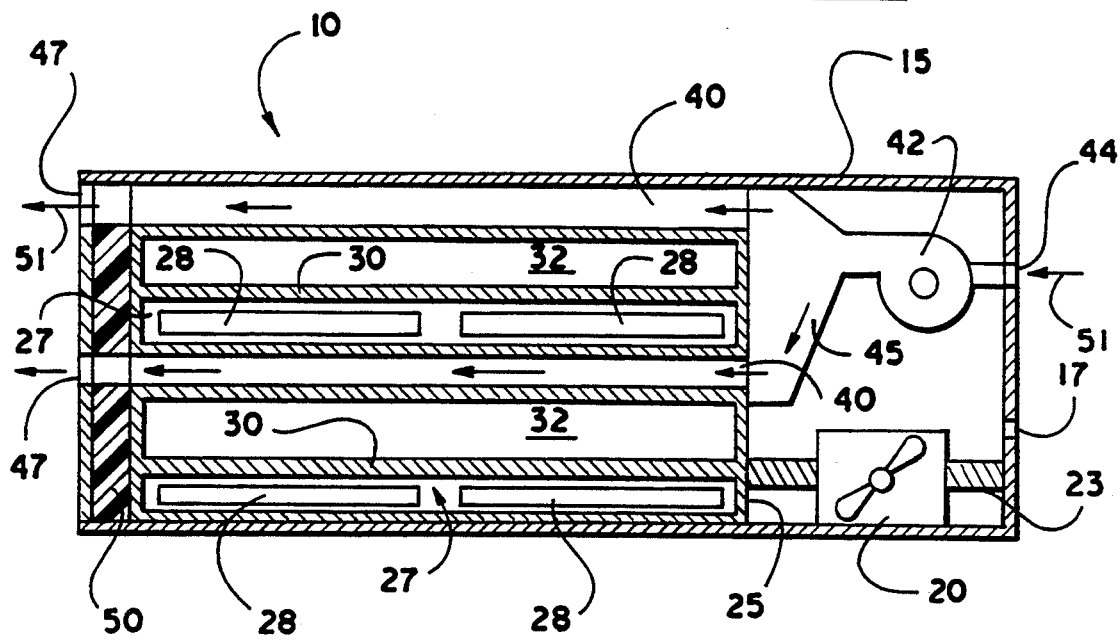
FIG_2

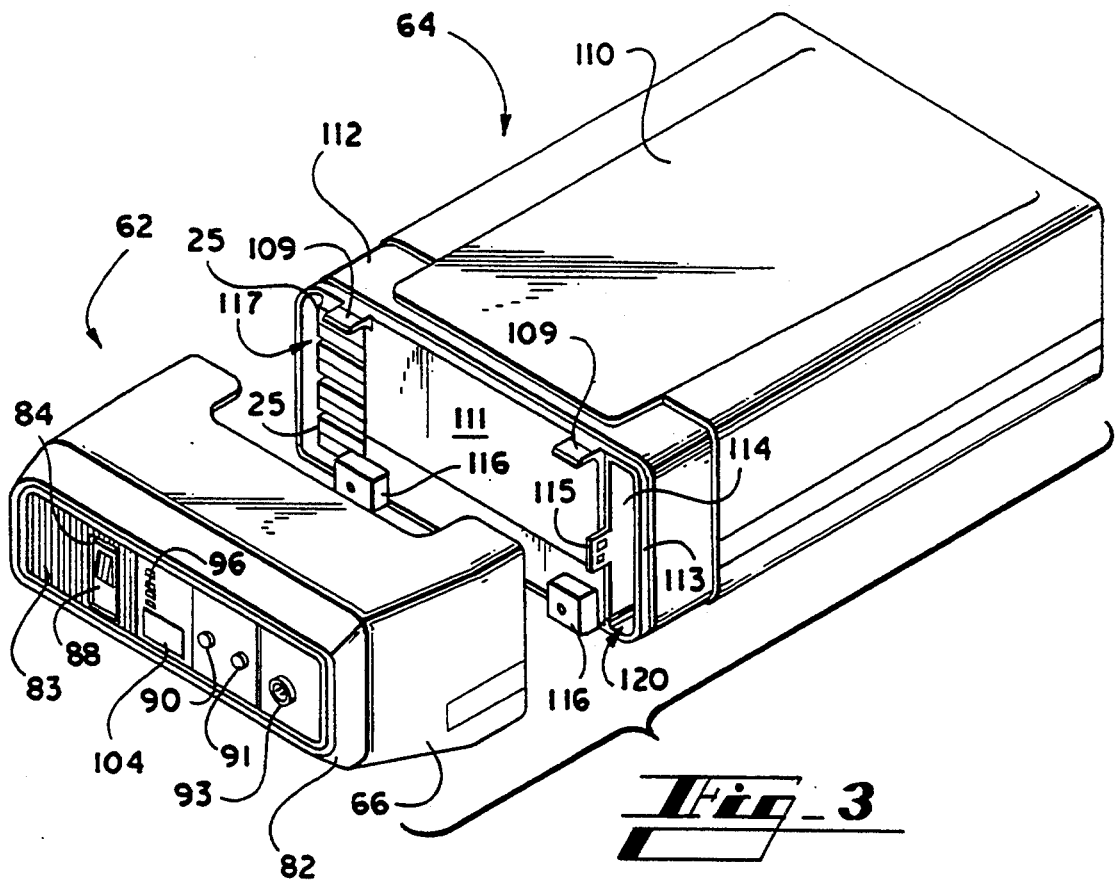
Fig_3
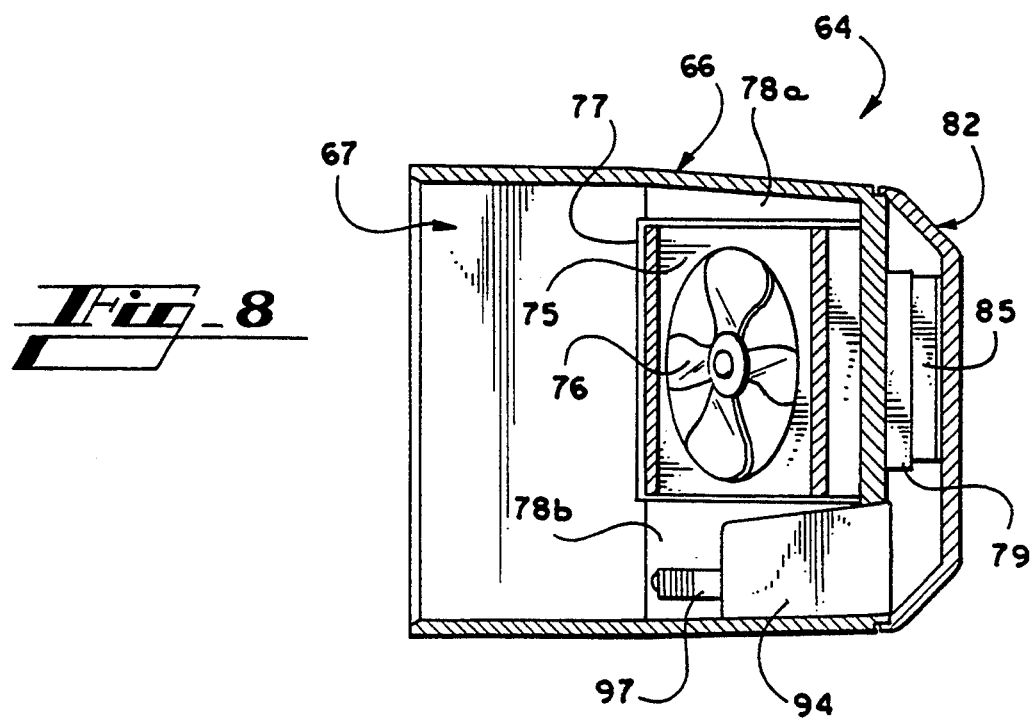
Fig_8

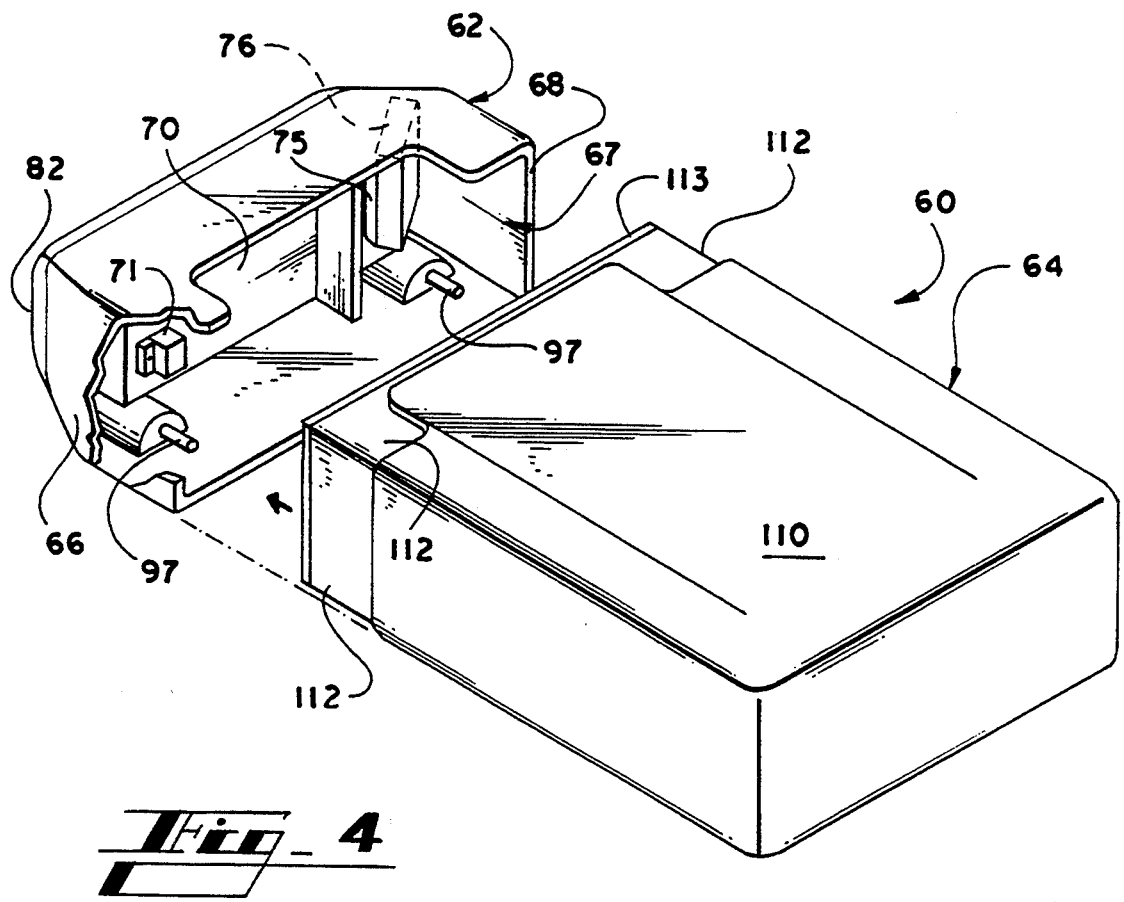
Fig_4
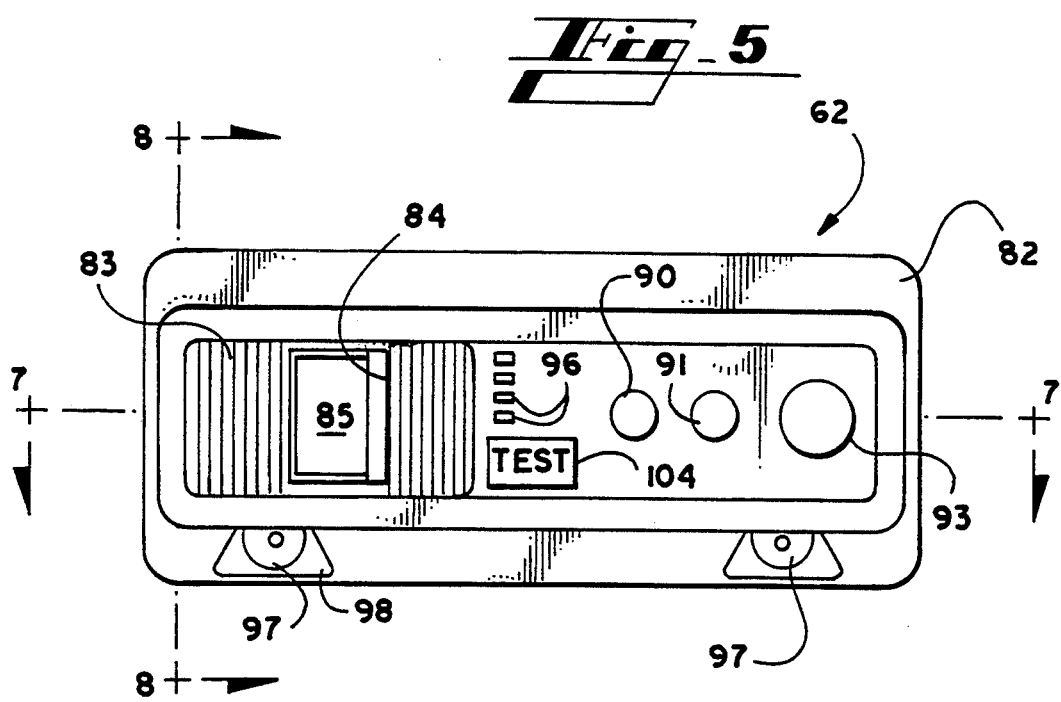
Fig_5

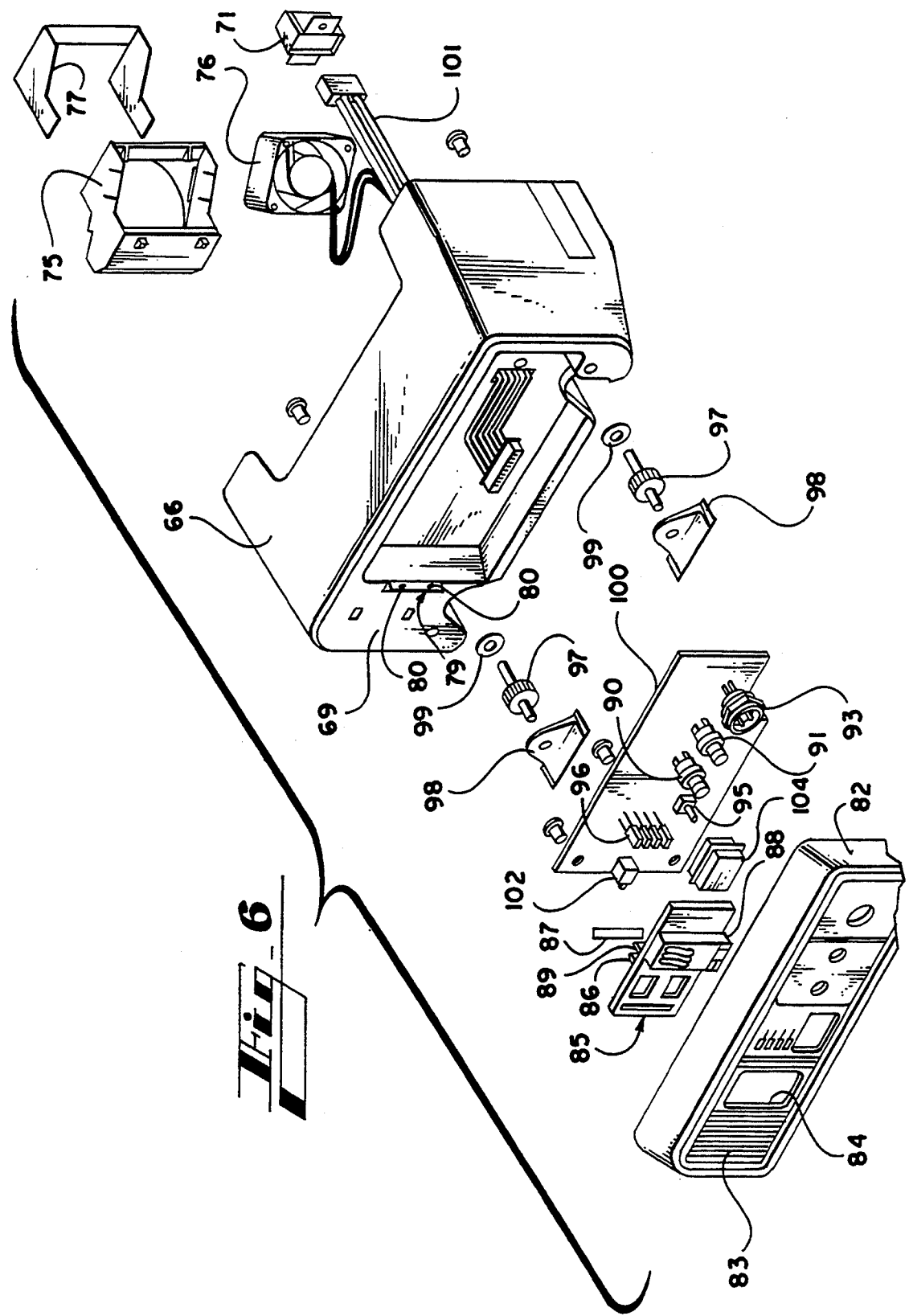

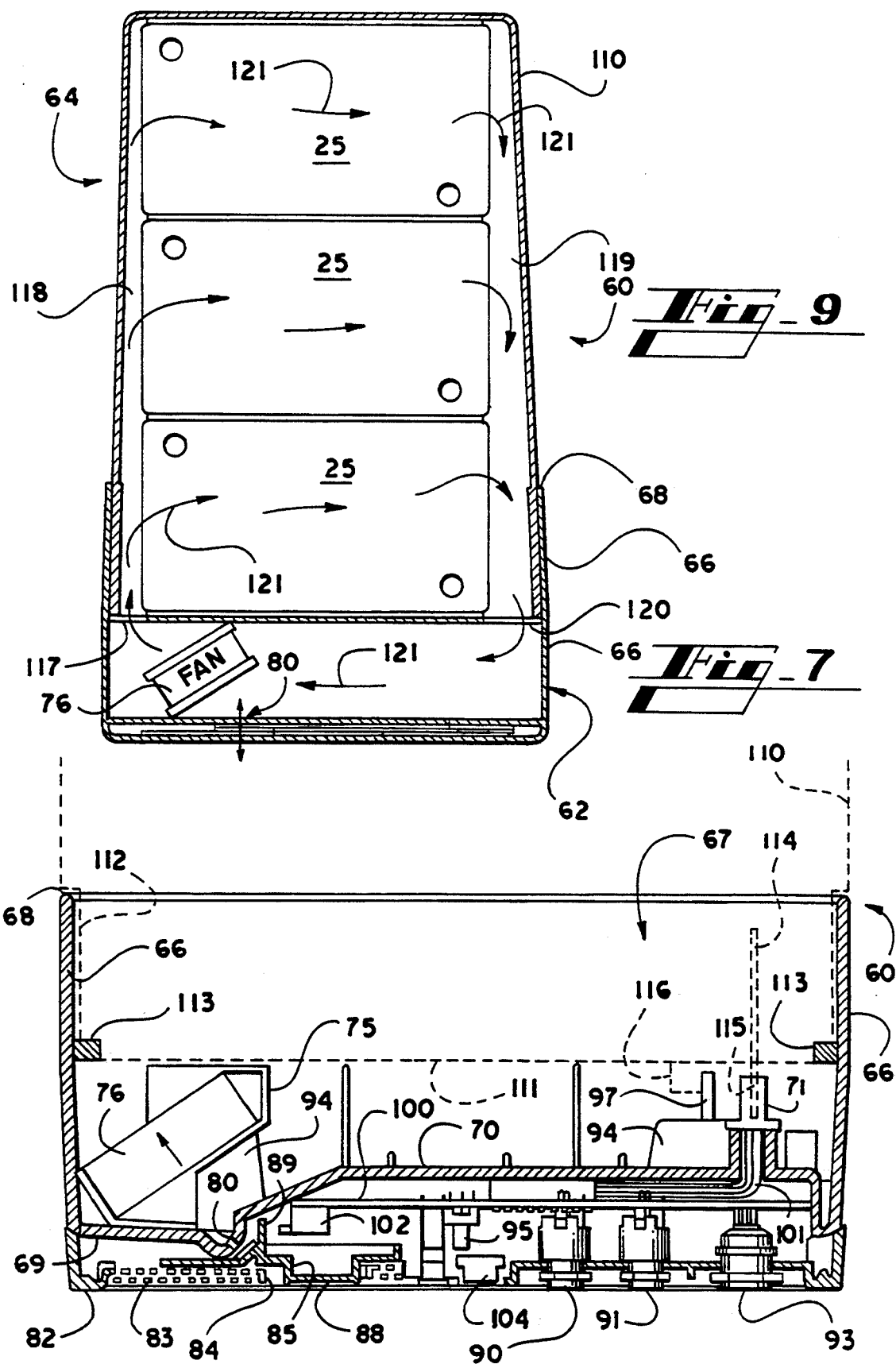

DIFFUSION CONTROLLED AIR MANAGER FOR METAL-AIR BATTERY

TECHNICAL FIELD

The present invention relates generally to batteries, and more particularly relates to a system for providing oxygen in a controlled manner to a metal-air battery.

BACKGROUND OF THE INVENTION

Metal-air battery cells include an air permeable cathode and a metallic anode separated by an aqueous electrolyte. For example, in a zinc-air battery, the anode contains zinc, and during discharge, oxygen from the ambient air is converted at the cathode to hydroxide, zinc is oxidized at the anode by the hydroxide, and water and electrons are released to provide electrical energy. Metal-air batteries have a relatively high energy density because the cathode of a metal-air battery utilizes oxygen from ambient air as a reactant in the electrochemical reaction rather than a heavier material such as a metal or metallic composition. Metal-air battery cells are often arranged in multiple cell battery packs within a common housing to provide a sufficient amount of power output. The result is a relatively lightweight battery.

Both primary and secondary metal-air batteries have been developed. A rechargeable metal-air battery is recharged by applying voltage between the anode and cathode of the metal-air battery cell and reversing the electrochemical reaction. Oxygen is discharged to the atmosphere through the air permeable cathode.

Thus, it is necessary to provide a supply of oxygen to the air cathodes of the cells. Some prior systems sweep a continuous flow of new ambient air across the air cathodes at a flow rate sufficient to achieve the desired power output. Such an arrangement is shown in U.S. Pat. No. 4,913,983 which uses a fan within the battery housing to supply a flow of ambient air to a pack of metal-air battery cells.

Given the known or measurable concentration of oxygen in the ambient air and the requirement for oxygen to operate a certain metal-air battery at a certain output level, a "stoichiometric" amount of ambient air necessary for such operation can be calculated. Many air managers for metal-air batteries draw make-up ambient air into the housing to provide four to ten times the required stoichiometric amount of air.

One problem with metal-air batteries is that the ambient humidity level can cause the metal-air battery to fail. Equilibrium vapor pressure of the metal-air battery results in an equilibrium relative humidity that is typically about 45 percent. If ambient humidity is greater than the equilibrium relative humidity value for the metal-air battery, the metal-air battery will absorb water from the air through the cathode and fail due to a condition called flooding. Flooding may cause the battery to burst. If the ambient humidity is less than the equilibrium relative humidity value for the metal-air battery, the metal-air battery will release water vapor from the electrolyte through the air cathode and fail due to drying out. In most environments where a metal-air battery is used, failure occurs from drying out.

The problems caused by ambient humidity are exacerbated in air depolarized cells because the oxygen diffusion electrode(cathode) typically passes water vapor as freely as oxygen due to the similar size and polarization of gaseous water molecules. Thus, as air is supplied to such batteries on discharge, or vented on recharge (in the case of rechargeable batteries), water vapor freely passes through the cathode as well.

Therefore, the art has recognized that a humidity level in the air passing over the air cathode differing from the humidity level within the cell will create a net transfer of water into or out of the cell, and may lead to the problems outlined above. Furthermore, such problems become more serious when large quantities of new ambient air continuously flow over the cathode.

Another problem associated with supplying a metal-air cell with continuous supplies of fresh air is transfer of carbon dioxide into the cell, where it neutralizes the electrolyte, such as potassium hydroxide. In the past, carbon dioxide absorbing layers have been placed against the exterior cathode surface to trap carbon dioxide. An example of such a system is shown in U.S. Pat. No. 4,054,725.

It has previously been proposed to separate the reactant air and cooling air streams through a metal-air battery so that the flow of cooling air may be regulated without concern for such water and carbon dioxide transfer problems. This does not solve the problems caused by such gases in the reactant air itself.

U.S. Pat. No. 4,118,544 to Przybyla describes the flooding and dry out problems and discloses a primary metal-air button cell used with watches and hearing aids. The cell interposes a barrier in the path of gas communication to the air cathode. One or more passageways (for example, one hole 0.001–0.002 inch in diameter) sized to restrict gas and water vapor access to the interior of the cell are formed in the barrier and are intended to prevent excessive moisture vapor influx or egress to or from the cell. The patent postulates that a partial vacuum is created within the cell as oxygen is utilized during discharge, and that such partial vacuum draws in more air.

The goal of Przybyla appears to be merely to restrict air access to the cathode of an individual cell. While this approach may limit the amount of dry or wet ambient air available to dry out or flood the cell, limiting all components of the air would also reduce the concentration of oxygen and possibly reduce the available output power level of the cell. Alternately, the number of holes could be such that a generously ample supply of oxygen to meet power demands passes into the cell, in which case an unnecessary excess of other components would also be introduced. Przybyla does not state that any gas passes through its holes in preference to any other gas, although this may inherently occur. In any event, Przybyla teaches such small holes that it might be difficult to generate sufficient power to operate a device such as a laptop computer, even if multiple openings were formed. These small holes also are said to require special manufacturing techniques.

Furthermore, Przybyla's cell relies on passive mixing of the components of the air to move oxygen to the cathode surface. Therefore, as the cell uses more oxygen from an already oxygen-depleted gas, the critical layer of air adjacent to the cathode may tend to become oxygen deficient.

It has been proposed in French Patent No. 2,353,142 to withdraw air at least partially exhausted of oxygen from metal-air cells, mix it in varying proportions with fresh air via a three-way valve, and return the mixture to the air cathodes. One purpose of this arrangement is to vary the output of the cells by varying the oxygen content of the incoming reactant air, which is accomplished by diluting the fresh air with air at least partially exhausted of oxygen. Another purpose of this arrangement is stated to be maintenance of a constant flow of gas on the electrodes, even when the flow rate of air consumed varies as a function of the power produced, to assure a good distribution of residual carbon dioxide and partial pressure of water vapor on the surface of the electrodes. It is thereby intended to avoid localized drying or localized concentrations of carbon dioxide. The fresh air admitted in this system includes water vapor and carbon dioxide in the proportions of the outside ambient air. Transfer of water to or from the cell will occur until equilibrium is reestablished. No method is disclosed to preferentially admit particular components of the fresh air.

Thus, there has been a need for a practical air manager system which can maintain a more stable water vapor equilibrium across the air cathode of a metal-air cell while still providing new oxygen needed for operation of the cell at desired power levels. Such a system should also be adaptable to a housing surrounding a plurality of cells rather than requiring a special plenum for each air cathode in a battery.

SUMMARY OF THE INVENTION

The present invention provides a better approach to solving the problem in the art described above by providing an air manager system for a metal-air cell or a battery of cells, which system preferentially admits oxygen from the ambient air into a housing enclosing the cell to make up for oxygen removed from the gas in the housing during operation of the cell, and mixes the gas in the housing to assure that oxygen is present in the layer of gas adjacent to the cathode. Preferential admission of oxygen is based upon the lowering of the partial pressure of oxygen inside the housing as compared to the ambient upon reduction of the oxygen concentration within the housing caused by operation of the cell. One or more ventilation openings in the housing are sized to preferentially diffuse oxygen into the housing. A fan is positioned within or adjacent to the housing to circulate and mix the gases which are present in the housing.

Generally described, the present invention provides an enclosure for a metal-air cell, comprising a housing for enclosing at least one metal-air cell, the housing effectively preventing exchange of gases between the interior of the housing and the surrounding environment with the exception of at least one ventilation opening, the ventilation opening or openings being sized to preferentially diffuse oxygen into the housing upon reduction of the oxygen concentration within the housing caused by operation of the cell or cells, and a fan positioned to circulate and mix gases which are present within the housing. By preferentially diffusing oxygen into the housing, the need of the cell for oxygen is met while maintaining a more stable water vapor and carbon dioxide equilibrium across the air cathode. Therefore, the cell has a reduced tendency to flood or dry out, and less carbon dioxide enters the cell to neutralize the electrolyte. The result is increased cell life at desired performance levels.

Preferably, the ventilation opening or openings are sized in the aggregate to maintain a desired output current density during discharge while maintaining an approximately steady relative humidity within the housing. For example, a current density of 25-50 ma per square cm of cathode surface may be desirable for powering a laptop computer. Furthermore, the ventilation opening or openings preferably are sized in the aggregate to maintain the partial pressure of oxygen within the housing at a level below the partial pressure of oxygen outside the housing and above a level needed to provide the desired output current density, while limiting water loss or gain by the cell or cells to less than about 0.01 grams per hour during discharge.

In one embodiment of the invention, the ventilation opening or openings are sized in the aggregate to permit a gas flow rate therethrough of up to about 10 cubic centimeters per minute. This may be accomplished using a single ventilation opening having a diameter of about 3/32 inch. However, the number of openings may be varied depending on the size of the cells. If the housing encloses, for example, from about 0.1 to about 1.5 cubic inches of free space per square inch of air cathode surface, then the number of ventilation openings is preferably selected and the openings sized so that in the aggregate they permit a gas flow rate therethrough of from about 0.5 to about 3 cubic centimeters per minute per square inch of air cathode surface. The shape of the openings also may vary. Each of the ventilation openings preferably has an open area in a range from about 0.00007 square inch to about 0.03 inch, which in the case of circular openings would correspond to a diameter in a range from about 0.01 inch to about 0.2 inch. The aggregate open area of all the ventilation openings preferably falls in a range from 0.00003-0.01 square inches per square inch of air cathode.

The fan is preferably positioned so that it circulates and mixes the air within the housing but does not force air in significant quantities through the ventilation opening or openings. In such a configuration, the fan does not interfere with the preferential diffusion function of the openings. As noted, the housing may contain several individual cells. If so, the air management functions of this invention may be carried out at the interface between the housing and the ambient air, and then it is not necessary to have any air restriction means associated with each individual cell. Furthermore, the present invention may, in some applications, eliminate air doors and associated operating mechanisms, and thus simplify construction of a metal-air battery. The advantages of the present invention are expected to benefit all types of metal-air cells regardless of air cathode compositions, cell configurations, and control circuit configurations.

As a result of the preferential admission of oxygen into the housing, the amount of other components of air in the housing may reach an equilibrium with the interior of the cell, while at the same time the amount of oxygen in the housing is less than normally found in a stoichiometric amount of ambient air. Whereas a typical oxygen concentration in ambient air is about 21%, the oxygen concentration within the housing of a battery built according to the present invention could drop to about 5-15% during operation of the cells.

When the invention is embodied in a secondary battery, the oxygen generated during recharge is preferentially exhausted through the ventilation opening or openings.

Thus, it an object of the present invention to provide an improved enclosure for a metal-air cell or battery.

It is a further object of the present invention to provide an improved method for supplying reactant air to a metal-air cell or battery.

It is a further object of the present invention to provide an air manager apparatus and method which maintains a more stable water vapor equilibrium across the air cathode of a metal-air cell while still providing new oxygen needed for operation of the cell at desired power levels.

It is a further object of the present invention to provide an air manager system which can be utilized with a single metal-air cell, or with a housing surrounding a plurality of cells so that each cell does not require a special plenum for its air cathode.

It is a further object of the present invention to provide an air manager system which limits introduction of ambient air into the reactant air volume.

It is a further object of the present invention to provide an air battery enclosure which preferentially admits an advantageous component of the air into the reactant air volume.

Other objects, features and advantages of the present invention will become apparent upon reviewing the following description of preferred embodiments of the invention, when taken in conjunction with the drawings and the appended claims.

BRIEF DESCRIPTION OF THE DRAWINGS

FIG. 1 is a diagrammatic top view of a metal-air battery embodying the present invention.

FIG. 2 is a vertical cross sectional view taken along line 2—2 of FIG. 1.

FIG. 3 is a front isometric view of a two-part battery embodying the present invention, showing a cell pack separated from a control section.

FIG. 4 is a rear isometric view of the two-part battery of FIG. 3, showing the cell pack separated from the control section, with portions broken away to show detail.

FIG. 5 is a front plan view of the control section of the battery of FIG. 3.

FIG. 6 is an exploded view of the parts of the control section of FIG. 3.

FIG. 7 is a horizontal cross sectional view taken along line 7—7 of FIG. 5.

FIG. 8 is a vertical cross sectional view taken along line 8—8 or FIG. 4.

FIG. 9 is a diagrammatic top view of the battery housing of FIG. 3, showing the position of the cells and the flow of air within the housing.

DETAILED DESCRIPTION

Referring now in more detail to the drawing, in which like numerals refer to like parts throughout the several views, FIGS. 1 and 2 show a metal-air battery pack 10 embodying the present invention. The battery 10 includes a cell stack 12 enclosed within a housing 15. The housing 15 isolates the cell stack 12 from the outside air with the exception of one or more ventilation openings 17. In the embodiment shown in FIGS. 1 and 2, a single ventilation opening 17 is utilized, and has a diameter of 3/32 inch.

A circulating fan 20 is provided to circulate and mix the gases within the housing 15. The arrows 22 shown in FIG. 1 represent typical circulation of the gases within the housing which provide reactant air to the cell stack 12. The capacity of the fan is preferably from about 10 cu. in. to about 200 cu. in. per minute per cu. in. of free space in the housing. The fan 20 may be positioned within the housing 15, as shown, or it may be mounted on the outside of the housing. In the latter case, the fan 20 would not be connected to draw fresh air into the housing, it would draw air from the housing and then return it to the housing. The fan 20 may be mounted in any convenient manner, and is shown supported by struts 23 extending from the fan to the housing 15 and to the cell stack 12.

The term "fan" used herein is intended to mean any device used to move air. The term "major transverse dimension" used herein refers to the widest dimension of an opening.

As shown in FIG. 2, the cell stack 12 may include a plurality of individual metal-air cells 25. Each cell defines a cathode plenum 27 to which an unrestricted supply of reactant air from within the housing can pass through circulation openings 28, which are formed on opposite sides of the cell. The cathode plenum defines a volume below an air cathode 30. Alternately, reactant air space may be provided by inserting or incorporating spacers between the cells 25.

Those skilled in the art will understand that many different catalyst systems are available for air cathodes. The advantages of the present invention with regard to controlling water vapor transfer to and from the cell are applicable to any air cathode chemistry. An example of an air cathode suitable for use with the present invention is described in U.S. Pat. Nos. 4,354,958; 4,518,705; 4,615,954; 4,927,514; and 4,444,852, which are incorporated herein by reference.

Each metal-air cell 25 also includes an anode/electrolyte chamber 32 which contains an anode (not shown) and an electrolyte, such as a normal 38 percent solution of potassium hydroxide. The anode may typically consist of a zinc paste made and positioned in the manner described in U.S. Pat. No. 4,957,826, which is incorporated herein by reference. Above the chamber 32 a cooling air pathway 40 is formed by legs (not shown) which space the cell 25 from the cell stacked upon it.

A cooling fan 42 is provided either inside or outside the housing 15. As shown in FIG. 2, the cooling fan 42 draws ambient air through an inlet 44 in the side of the housing 15. The ambient air is forced into a cooling plenum 45 which extends to sealingly engage the cell stack 12 in a manner which covers the exposed ends of the cooling pathways 40. At the ends of the cooling air pathways opposite the cooling air plenum 45, a plurality of cooling air outlets 47 are formed in the housing 15. A gasket 50 is interposed between the cell stack 12 and the side of the housing 15 in order to seal around the outlets 47. As shown by the arrows 51, the cooling air is drawn in through the inlet 44 and exhausted back to the ambient atmosphere through the outlets 47. The pathway of the cooling air is isolated from the reactant air within the housing 15.

EXAMPLE

A pair of zinc-air cells are positioned generally as shown in FIGS. 1 and 2. The dimensions of the housing are height 1.3 inches by width 3.2 inches by depth 6 inches. Each cell has dimensions height 0.35 inch by width 3 inches by depth 5.3 inches, for a volume of about 5.5 cu. inches. Cooling air spaces 40 are each 0.2 inch high, and a 0.2 inch space is provided above the top cell. The free space volume within the housing, omitting the space occupied by the fans 20 and 42 and the plenum 45, is about 11.9 cu. inches. The exposed area of each of the air cathodes totals 14.8 square inches, so that in the housing there is about 0.4 cu. in. of free volume per sq. in. of air cathode. A single ventilation opening 3/32 inch in diameter is provided in the housing, and the fan 20 has a capacity of 500 cu. in. per minute. The battery is positioned in an ambient environment having a relative humidity level of 30%, and the cells rise 20° F. in temperature during operation. The output of the cells is 1.132 volts at 1 amp., and the water loss from the cell is abut 0.005 grams per hour.

Since such a cell can lose up to 13–16 grams of water and continue to operate, the expected life before dry out exceeds 1000 hours. A similar buffering effect on water gain in a high relative humidity environment is expected. Therefore, other factors influencing cell life, such as anode recharge efficiency, are expected to determine cell life, rather than dry out or flooding.

The present invention may also be embodied in a metal-air battery pack 60 shown in FIGS. 3–9. In this embodiment, air manager and electric control elements are contained in a reusable control section 62, into which may be plugged a disposable cell stack section 64. As described below, the cell stack section 64 may be constructed from inexpensive materials, so that the control section 62 may be used with more than one precharged cell stack in sequence as the cells discharge, or with new stacks when a used stack reaches the end of its useful life after many recharge cycles.

The reusable control section 62 includes an open ended housing 66 which may be a molded plastic part. The housing 66 defines a hooded opening 67 and a peripheral edge 68 extending around the hooded opening. The housing 66 also includes a front wall 69 in which is formed a recessed vertical bulkhead 70 extending across a portion of the housing between the front wall and the hooded opening. A female connector 71 extends rearwardly from the bulkhead 70 adjacent to one side of the housing 66. The connector is positioned to form an electrical connection between the control section 62 and the cell stack 64 in a manner described below.

In the opposite side of the housing 66 a fan mounting bracket 75 positions a fan 76 diagonally with respect to the front wall 69 to direct a flow of air from the fan rearwardly and toward the side of the housing 66. Air is prevented from passing around the fan mounting bracket 75 by an upper baffle 78a and a lower baffle 78b, shown in FIG. 8. The baffles extend from the housing 66 to meet the mounting bracket 75. A fan gasket 77, shown in FIGS. 6 and 9, is positioned between the mounting bracket and each of the baffles, and also between the mounting bracket and the cell stack 64, as shown in FIG. 7, when the cell stack is inserted into the control housing 66. Thus, the low pressure and high pressure sides of the fan 76 are isolated from one another. The fan 76 preferably recirculates air at a capacity of about 500 cubic inches per minute.

The front wall 69 of the housing 66 defines an air inlet projection 79 which extends outwardly on the front side of the front wall 69 and has a generally triangular cross section. A pair of ventilation openings 80, similar to the ventilation opening 17 described in connection with the first embodiment, are located in the air inlet projection 79 opposite the low pressure side of the fan 76. The openings 80 are each about 3/32 inch in diameter.

A face plate 82 snaps onto the front wall 69 of the housing 66, covering the entire front wall. In front of the ventilation openings 80 a decorative grill 83 is formed of spaced vertical posts which allow gas to flow through the grill. A switch actuator opening 84 is also formed in the face plate 82, for receiving a front protrusion 88 of a switch actuator 85 which also serves as an air door. The actuator 85 slides in a track (not shown) defined in the rear surface of the face plate. An integrally formed air door projection 86 extends rearwardly from the air door 85 and forms a generally triangular cross section. On a surface of the projection 86 facing the air inlet projection 79, an air door gasket 87 is fixed. When the air door 85 slides toward the projection 79, the gasket 87 presses against the air openings 80 and seals them. The relationship between the air door 85 and the air openings 80 can best be seen in FIG. 7. The actuator/air door 85 also defines a rearwardly extending protrusion 89 for actuating an electric switch as described below.

A pair of power supply output jacks 90 and 91 as well as a recharge connector 93, a test actuator 95 and a set of charge level indicator LEDs 96 are all surface mounted on a printed circuit board (PCB) 100 which is positioned in the recess between the bulkhead 70 and the face plate 82. These components extend through appropriate openings formed in the face plate 82. A switch 102 is mounted on the PCB 100 at the edge closest to the actuator 85, so that the switch 102 is mechanically activated by the protrusion 89 when the actuator 85 is slid toward the PCB 100. This turns on the fan 76 via conventional circuitry (not shown) as the ventilation openings 80 are uncovered. The test actuator 95 may be actuated by depressing a test button 104 that extends from the actuator 95 through an opening in the face plate. The PCB 100 is connected to the connector 71 by conductors 101. It will be understood by those skilled in the art that the PCB may include electronics which permit the level of charge in the battery to be monitored and displayed by the LEDs 96 upon depression of the button 104, and the recharging process to be controlled. However, such electronics are not part of the present invention, which provides air management benefits regardless of the particular nature of such electronics.

A pair of thumbscrews 97, shown in detail in FIG. 6, are mounted in recesses 94 in the bottom of the housing 66 for securing the control section 62 to the cell stack section 64. The thumbscrew shafts extend to the rear through the housing, as shown in FIGS. 4, 7, and 8, and are supported at the front of the housing by thumbscrew covers 98. Where they enter the housing 66, the thumbscrews carry washer-like seals 99 to prevent air flow around the thumbscrews.

The cell stack section 64 includes a cell stack housing 110 containing a plurality of metal-air cells 25. FIG. 9 shows diagrammatically a 12-volt battery containing three stacks of four 1.2-volt cells, for at total of twelve cells. The cell stack housing 110 is surrounded by an indentation 112 formed in its top, bottom and sidewalls at the front of the housing 110, as shown in FIG. 3. The indentation 112 enters the control section housing 66, as shown in FIG. 5. A gasket 113 extends around the edge of the indentation 112 to engage the inside of the housing 66, which becomes narrower from back to front. The cells 25 are retained by a front wall 111, which includes a pair of support tabs 109 extending forwardly to engage the upper interior portion of the housing 66.

A printed circuit board 114 is attached to the side of the stack of cells 25, and carries circuitry for connecting the cells as well as a memory device for storing information concerning the status of the cells. An edge connector 115 of the PCB 114 extends forwardly beyond the front wall 111 and is aligned to be received by the connector 71 of the housing 66. A pair of threaded nuts or retaining clips 116 are mounted to the lower edge of the front wall 111 of the housing 110 to receive the thumbscrews 97.

Referring to FIGS. 3 and 9, the cells 25 are positioned within the housing 110 to create an air delivery plenum 118 along the fan side of the housing 110, into which air can be blown by the fan 76 through an opening 117 at the front of the housing 110. Along the opposite side of the cells an air return plenum 119 is formed, and air from the plenum 119 can return to the fan 76 through an opening 120 also at the front of the housing 110 opposite the entry opening 117. The twelve cells 25 may have a combined air cathode surface area of about 178 square inches. When two air inlet/outlet holes 80 are provided, each 3/32 inch in diameter, the holes provide about 0.00008 square inch of hole area per square inch of air cathode in the cell stack.

The control section 62 and the cell stack section 64 fit together as shown in FIG. 7, with the indentation 112 matingly received within the hooded opening 67 until the peripheral edge 68 of the housing 66 abuts the unindented portion of the housing 110. As the two sections are joined, the gasket 113 engages the interior of the housing 66 to prevent any significant air leakage. Also, the cell stack connector 115 engages the control connector 71, so that power from the cells can flow through wiring conductors 101 to the output jacks 90 and 91, and recharging current can flow to the cells from the connector 93. When the sections 62 and 64 are assembled, the thumbscrews 97 can be rotated to thread into the threaded retainers 116 to secure the sections, which are also supported in their joined configuration by the tabs 109.

The path of air circulation created by the fan 76 is shown by the arrows 121 in FIG. 9. When the switch actuator 85 is slid to the right as viewed in FIG. 5, the ventilation openings 80 are opened and the switch 102 is engaged by the projection 89. This starts the fan 76. Air is blown from the housing 66 through the opening 117 into the plenum 118. The opening 117 is large enough so that it does not significantly restrict the flow of air into the plenum 118. From the plenum 118, the air flows across the stacked cells through both cathode reactant air plenums and cooling air pathways of the type discussed above in connection with the first embodiment. In the embodiment of FIGS. 3–9, both the reactant air pathways and the cooling air pathways are aligned in the direction of the arrows 121, and there is no separate control of cooling and reactant air flow rates. After crossing the cells, the air enters the air return plenum 119 and is drawn through the unrestricted opening 120 into the control section housing 66 for recirculation by the fan 76.

As the air recirculates within the battery, new oxygen enters preferentially through the ventilation openings 80 in the manner described above in connection with the ventilation opening 17. It should be understood that the assembled battery 60 is substantially airtight with the exception of the openings 80 which are exposed when the switch actuator is in its "on" position. Gaskets 113 and 99 are provided to form a seal between the control section 62 and the cell stack section 64, and other gaskets may be provided to seal other potential leakage locations, in a manner known to those skilled in the art.

It will be understood from the foregoing that the present invention provides an air manager system which maintains a more stable water vapor and carbon dioxide equilibrium across the air cathode of a metal-air cell while still providing new oxygen needed for operation of the cell at desired power levels. As the fan circulates the gases within the battery housing, the oxygen needed for operation of the cell is kept in contact with the air cathode even though its concentration within the housing is reduced. Since oxygen is preferentially drawn in through the ventilation opening or openings, the concentrations of water vapor and carbon dioxide remain more stable, resulting in less transfer across the cathode. Therefore, the cell is less susceptible to drying out or flooding, and less carbon dioxide intrudes into the cell. This is accomplished by a structure that is easy to construct and does not require more complicated mechanical air doors or valves and an associated automatic control system.

It should be understood that the foregoing relates only to preferred embodiments of the present invention, and that numerous changes may be made therein without departing from the spirt and scope of the invention as defined by the following claims.

What is claimed is:

1. An enclosure for a metal-air cell, comprising:
 a housing for enclosing at least one metal-air cell, said housing effectively preventing exchange of gases between the interior of said housing and the surrounding environment with the exception of diffusion through one or more ventilation openings, said ventilation opening or openings sized to preferentially diffuse oxygen into said housing upon reduction of the oxygen concentration within said housing caused by operation of said cell; and
 a fan positioned to circulate and mix gases within said housing without creating an inlet or outlet flow disruptive of said diffusion.

2. The enclosure of claim 1, wherein each of said ventilation openings has an open area in a range from about 0.00007 square inch to about 0.03 square inch.

3. The enclosure of claim 1, wherein said ventilation opening or openings are sized in the aggregate to permit a gas diffusion flow rate therethrough of up to about 10 cubic centimeters per minute.

4. The enclosure of claim 1, wherein said ventilation opening or openings are sized in the aggregate to limit water loss or gain by said cells to less than about 0.01 grams per hour during discharge.

5. The enclosure of claim 1, wherein said ventilation opening or openings are sized in the aggregate to limit water loss or gain by said cells to less than about 0.005 grams per hour during discharge.

6. The enclosure of claim 1, wherein said housing defines a single one of said ventilation openings.

7. The enclosure of claim 1, wherein said ventilation opening or openings are sized in the aggregate to maintain an approximately steady relative humidity within said housing during discharge.

8. The enclosure of claim 7, wherein said ventilation opening or openings are sized in the aggregate to maintain a desired output current density during discharge while maintaining said approximately steady relative humidity within said housing.

9. The enclosure of claim 8, wherein said ventilation opening or openings are sized in the aggregate to maintain the partial pressure of oxygen within the housing at a level below the partial pressure of oxygen outside the housing and above a level needed to provide said desired output current density.

10. The enclosure of claim 1, wherein said housing encloses from about 0.1 to about 1.5 cubic centimeters of free space per square centimeter of air cathode surface, and wherein said ventilation opening or openings are sized in the aggregate to permit a gas flow rate therethrough of from about 0.5 to about 3 cubic centimeters per minute per square centimeter of air cathode surface.

11. The enclosure of claim 1, wherein said housing comprises a first section containing said cell and a second section containing said fan, said sections being joined at section openings configured to permit open passage of gases between said sections.

12. The enclosure of claim 11, wherein said second section includes at least one terminal for connecting said cell to a load, and wherein said first and second sections include mating connectors which engage to connect said cell to said terminal or terminals when said sections are joined.

13. The enclosure of claim 1, wherein said ventilation opening or openings and said fan provide sufficient oxygen to said cell to operate said cell at a current density of at least 25 ma per square cm of air cathode surface.

14. A method for providing reactant air to a metal-air cell, comprising the steps of:
confining at least one metal-air cell within a housing;
preferentially diffusing oxygen into said housing upon reduction of the oxygen concentration within said housing caused by operation of said cell by exchanging gases between the interior of said housing and the surrounding environment by diffusion through at least one ventilation opening sized to preferentially diffuse oxygen; and
circulating and mixing gases within said housing with a fan without creating an inlet or outlet flow disruptive of diffusion through said ventilation opening.

15. The method of claim 14, wherein said step of exchanging gases comprises permiting a gas flow rate through said ventilation opening or openings of up to about 10 cubic centimeters per minute.

16. The method of claim 14, wherein said step of exchanging gases comprises permiting a gas aggregate to limit water loss or gain by said cells to less than about 0.01 grams per hour during discharge.

17. The enclosure of claim 14, wherein said ventilation opening or openings are sized in the aggregate to limit water loss or gain by said cells to less than about 0.005 grams per hour during discharge.

18. The enclosure of claim 14, wherein said step of preferentially diffusing oxygen into said housing comprises exchanging gases between the interior of said housing and the surrounding environment through at least one ventilation opening having an open area in a range from about 0.00007 square inch to about 0.03 square inch.

19. An enclosure for a metal-air cell, comprising:
a housing for enclosing at least one metal-air cell, said housing effectively preventing exchange of gases between the interior of said housing and the surrounding environment with the exception of a single ventilation opening, said ventilation opening sized to preferentially diffuse oxygen into said housing upon reduction of the oxygen concentration within said housing caused by operation of said cell; and
a fan positioned to circulate and mix gases within said housing without creating an inlet or outlet flow disruptive of diffusion through said ventilation opening.

20. A method for providing reactant air to a metal-air cell, comprising the steps of:
confining at least one metal-air cell within a housing;
exchanging gases between the interior of said housing and the surrounding environment only through a single ventilation opening sized to preferentially diffuse oxygen into said housing upon reduction of the oxygen concentration within said housing caused by operation of said cell; and
circulating and mixing gases within said housing with a fan without creating an inlet or outlet flow disruptive of diffusion through said ventilation opening.

21. A method of maintaining an approximately steady relative humidity within a metal-air battery housing during discharge or one or more cells within said housing, comprising the steps of:
exchanging gases between the interior of said housing and the surrounding environment only through one or more ventilation openings sized to preferentially diffuse oxygen into said housing upon reduction of the oxygen concentration within said housing caused by operation of said cells; and
circulating and mixing gases within said housing with a fan without creating an inlet or outlet flow disruptive of diffusion through said ventilation openings.

22. An enclosure for a metal-air cell, comprising:
a housing for enclosing at least one metal-air cell;
a fan positioned to circulate and mix gases within said housing;
said housing including a first section containing said cell and a second section containing said fan, said sections being joined at section openings configured to permit open passage of gases between said sections; and
said housing effectively preventing exchange of gases between the interior of said housing and the surrounding environment with the exception of at least one ventilation opening, said ventilation opening or openings sized to preferentially diffuse oxygen into said housing upon reduction of the oxygen concentration within said housing caused by operation of said cell.

* * * * *